May 1, 1956
F. V. MURPHY
2,743,721
BELT SUPPORT OR HERNIA STAY
Filed Sept. 23, 1954
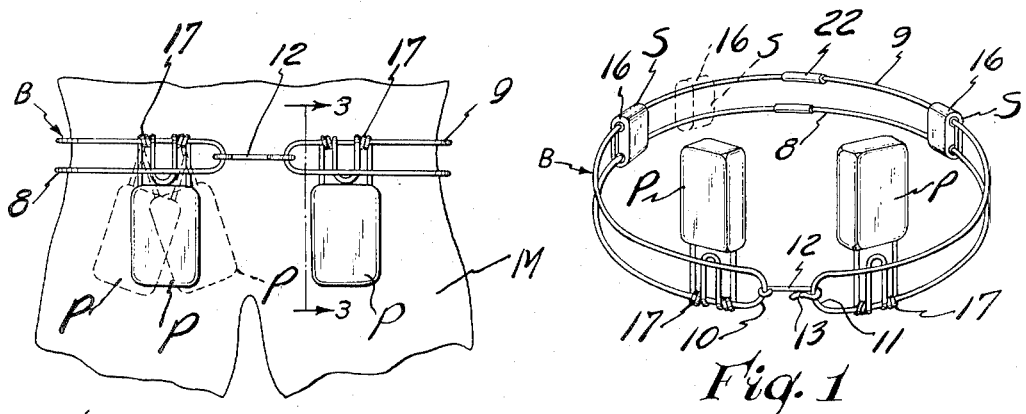
Fig. 1
Fig. 2
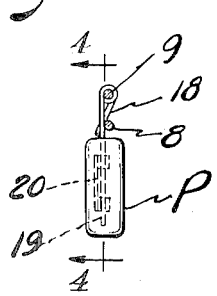
Fig. 3
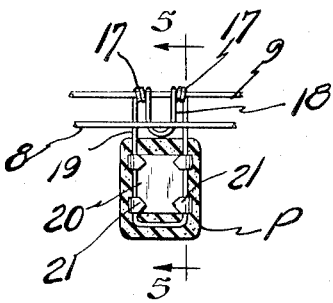
Fig. 4
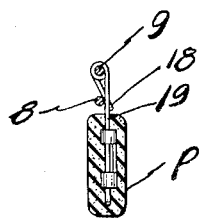
Fig. 5
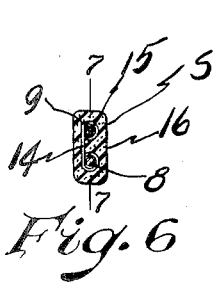
Fig. 6
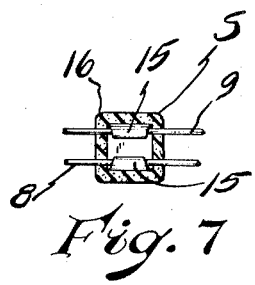
Fig. 7
INVENTOR.
Frank V. Murphy.
BY
Isarman & Isarman.
ATTORNEYS

United States Patent Office 2,743,721
Patented May 1, 1956

2,743,721

BELT SUPPORT OR HERNIA STAY

Frank V. Murphy, Bay City, Mich.

Application September 23, 1954, Serial No. 457,883

3 Claims. (Cl. 128—104)

This invention relates to a belt support or hernia stay designed to afford relief from hernia, and more particularly to a support or stay which, when in applied position, will be under compression to yieldingly hold and press ruptures back into their proper natural position.

Another object is to design a support or stay on which the pressure pads are adjustably and yieldably mounted, so that any desired pressure may be applied to permit proper and unrestrained healing thereof.

A further object is to design a very simple, lightweight structure including spaced-apart body contact pads, circumferentially adjustable on the support so that they may, when desired, be readily shifted, without removal, to change the location of the body-contacting portion of the pad, thus relieving pressure areas and preventing chaffing and/or skin irritation.

A further object still is to design a relatively inexpensive, sanitary, lightweight stay or support which can be readily manufactured, and assembled, which yields with natural body movement, and which is not irritating to wear.

Still a further object is to design a hernia support or stay which can be readily manufactured and assembled, which does not absorb perspiration and body odors, and in which the contact and hernia pads are readily adjustable and/or removable for cleaning, repair, or for any other purpose.

With the above and other objects in view, the present invention consists in the combination and arrangement of parts, hereinafter more fully described, illustrated in the accompanying drawing, and more particularly pointed out in the appended claims, it being understood that equivalent changes may be made in the various elements of the invention, without departing from the spirit of the invention, or sacrificing any of the advantages thereof.

In the drawing:

Fig. 1 is a perspective, elevational view of my hernia support, the broken lines illustrating the adjustment of the contact pads on the belt frame with the pressure pads swung or adjusted to position above the belt line.

Fig. 2 is a fragmentary, front elevational view showing the support in position on a wearer with the pressure pads swung down, the broken lines showing the pads swung transversely on the belt support.

Fig. 3 is a transverse, sectional view through the support, taken on the line 3—3 of Fig. 2.

Fig. 4 is an enlarged, fragmentary, sectional view of one of the pressure pads taken on the line 4—4 of Fig. 3.

Fig. 5 is a vertical, sectional, edge elevational view of the pad taken on the line 5—5 of Fig. 4.

Fig. 6 is a sectional, elevational view through one of the body pads.

Fig. 7 is a transverse, sectional view taken on the line 7—7 of Fig. 6.

Referring now more particularly to the drawing in which I have shown the preferred embodiment of my invention, the hernia support comprises a pair of vertically spaced, circumferentially disposed, preferably metallic bands 8 and 9, the ends of which are looped as 10 and 11 to form a belt B, a hook 12 being loosely secured on the one looped end of the belt, and is provided with a hook 13 as usual for releasable engagement with the opposite looped end of said belt, and this hook can be of any desired shape or design and can, of course, be rubber-coated or finished to eliminate wear or friction.

Spacer members S are adjustably mounted on the bands 8 and 9 as shown, each spacer comprising a flat metal plate 14, the upper and lower edges of which are rolled as at 15 to slidably accommodate the members 8 and 9. Each spacer is completely covered with a resilient padding 16 of a suitable thickness to space the members 8 and 9 from the body M of the wearer, and any desired number of pads can be provided, said pads being freely adjustable around the circumference of the belt.

Pressure pad assemblies P are also circumferentially adjustable on the belt and are formed as clearly shown in Figs. 4 and 5 of the drawing, each pad assembly including a coiled spring structure 17, one end of which terminates in a projecting U-shaped leg section 18, the opposite forked end 19 engaging a metallic plate 20 provided with rolled ears 21 which are rolled over said forked ends, said plate being covered by a suitable flexible padding material 16. These pressure pads are readily adjustable on the belt, all as indicated in Figs. 1 and 2 of the drawing, and when the pads are in position shown in Fig. 2, they can be adjusted circumferentially or swung in an arc to cover an area below the belt line. In this arrangement, the pad assemblies are mounted on the member 9 and the leg 18 is disposed behind the member 8. This forces the pads inwardly against the wearer's body and provides a yielding pressure on the area covered thereby.

When the pressure pads are in position shown in Fig. 1, they are adjusted to cover an area above the belt line. In this adjustment, the assembly is shifted circumferentially so that it is mounted on the lower strand member 8, and the leg 18 then bears against the inner face of the strand 9 to yieldingly force the pad against the desired area. I wish to particularly point out that each pressure pad is circumferentially adjustable on the belt; they can be swung up, down or at an angle as clearly shown in Fig. 2. A clasp 22 forms a connection for the two ends of the strand 9, and the same kind of connection can be utilized for the strand 8 if so desired.

While in the instant case I have shown a coiled spring arrangement to provide for proper tension or pressure, it will be understood that any desired design may be provided without departing from the spirit of the invention.

Conventional hernia belts at present on the market contact and snugly hug the body throughout their entire circumference, and consequently are hot and irritating to wear in warm weather. They quickly absorb perspiration and require frequent cleaning to eliminate body odors etc., and they do not yield with body movement, but with the instant belt, the contact pressure pads only come into contact with the body and the contact pads are readily shiftable from place to place so that no irritation develops, and they, too, are readily removable for cleaning when necessary.

From the foregoing description, it will be obvious that I have perfected a very simple, practical, and inexpensive hernia belt in which the contact pads cover but a small area and are readily shiftable when desired, and the pressure pads are adjustable to position, either above or below the belt proper, so that difficult to reach areas can be readily covered and the pressure maintained yieldingly at all times.

What I claim is:

1. A rupture stay comprising, an elongated support member formed of vertically spaced connected metallic strands, the free ends of which form continuous closed loops, means for releasably connecting said loops, pressure pad assemblies adjustably mounted on one of said strands, each assembly including a metallic resilient frame with horizontally spaced apart projecting wound sections slidable on said strands and around said loops to dispose the selected pad assembly on a selected strand, and a resilient tongue forming a part of said metallic frame and engageable with the opposite strand to that on which said frame is slidably mounted for tensioning said pressure pads.

2. A hernia stay comprising, an elongated circular support member formed of vertically spaced strands, the free ends of which form continuous closed loops, means for releasably connecting said loops, circumferentially adjustable pressure pads mounted on one of said strands, each pad including a metallic frame with horizontally spaced, projecting wound sections slidable on said strands and around said loops to dispose the pad frame on a selected strand, a resilient tongue forming a part of said frame and engageable with the strand opposite to that on which the frame is slidably mounted to tension said pressure pad, and contact pads circumferentially adjustable on said circular support member.

3. The combination set forth in claim 2 in which a rigid plate is provided in each contact pad, said metallic strands being slidable with relation to said plate, and flexible material forming a cover for both sides of said plate.

References Cited in the file of this patent

UNITED STATES PATENTS

| | | |
|---|---|---|
| 237,926 | Stuart | Feb. 15, 1881 |
| 242,926 | Herrick | June 14, 1881 |
| 574,467 | Ware et al. | Jan. 5, 1897 |
| 966,221 | Lange | Aug. 2, 1910 |